United States Patent
Daneshyar et al.

(10) Patent No.: US 9,945,708 B2
(45) Date of Patent: Apr. 17, 2018

(54) UNIVERSAL DEVICE FOR MONITORING AND REPORTING FLUID CONSUMPTION AND METHOD USING SAME

(71) Applicant: Thirsti Ltd, Mappleborough Green, Studley, Warwickshire (GB)

(72) Inventors: Phillip Daneshyar, Warwickshire (GB); Alexander Edward Smith, Birmingham (GB); Tyrone Bedessy, Durban (ZA)

(73) Assignee: THIRSTI LTD, Mappleborough Green, Studley, Warwickshire (GB)

(*) Notice: Subject to any disclaimer, the term of this patent is extended or adjusted under 35 U.S.C. 154(b) by 0 days.

(21) Appl. No.: 15/589,360

(22) Filed: May 8, 2017

(65) Prior Publication Data

US 2017/0336240 A1 Nov. 23, 2017

Related U.S. Application Data

(63) Continuation of application No. 15/161,518, filed on May 23, 2016, now Pat. No. 9,677,923.

(51) Int. Cl.
*G08B 21/00* (2006.01)
*G01F 23/14* (2006.01)
*B67D 3/00* (2006.01)
*G01F 23/16* (2006.01)

(52) U.S. Cl.
CPC ............. *G01F 23/14* (2013.01); *B67D 3/007* (2013.01); *B67D 3/0061* (2013.01); *G01F 23/161* (2013.01)

(58) Field of Classification Search
CPC ........ G01F 13/00; G01P 15/00; G06F 3/0414; G06F 3/0489; G06F 3/106; G06F 23/14; F04B 43/02; F04B 43/021; F04B 43/023; F04B 6703/0051; B01L 3/00; G08B 21/00; A61M 1/28; B67D 3/0061; B67D 3/0077; G01L 7/08
See application file for complete search history.

(56) References Cited

U.S. PATENT DOCUMENTS

| | | | | |
|---|---|---|---|---|
| 9,677,923 | B1* | 6/2017 | Daneyshar | G01F 23/14 |
| 2002/0070861 | A1* | 6/2002 | Teller | B67D 1/1405 340/572.1 |
| 2009/0204256 | A1* | 8/2009 | Wegelin | B05B 11/30 700/244 |
| 2013/0165847 | A1* | 6/2013 | Scarpaci | A61M 1/288 604/28 |

(Continued)

FOREIGN PATENT DOCUMENTS

| | | |
|---|---|---|
| DE | 327 063 C | 10/1920 |
| WO | WO 2008/106193 A1 | 9/2008 |
| WO | WO 2015/200904 A1 | 12/2015 |

*Primary Examiner* — Van Trieu
(74) *Attorney, Agent, or Firm* — Leason Ellis LLP (57) ABSTRACT

A liquid intake tracking device for removable insertion into a beverage container in order to track an amount of liquid consumed, the rate of liquid consumption over time, and to provide alerts to the user. The device connects wirelessly to an application executing on an external electronic device which provides user with liquid consumption data and reports concerning the user's interaction with the beverage container. Methods for tracking liquid intake are also disclosed.

19 Claims, 8 Drawing Sheets (56) References Cited

U.S. PATENT DOCUMENTS

2014/0372045 A1* 12/2014 Keski-Pukkila ..... A61B 5/6887
702/19
2015/0360927 A1* 12/2015 Sweeney ................ A47G 23/16
222/41

* cited by examiner

UNIVERSAL DEVICE FOR MONITORING AND REPORTING FLUID CONSUMPTION AND METHOD USING SAME

CROSS-REFERENCE TO RELATED APPLICATIONS

This application is a continuation of U.S. Non-Provisional patent application Ser. No. 15/161,518, entitled "Universal Device for Monitoring and Reporting Fluid Consumption and Method Using Same" filed May 23, 2016, now U.S. Pat. No. 9,677,923 which is hereby incorporated by reference as if set forth in its entirety herein.

FIELD OF INVENTION

The present invention relates to liquid level detectors, specifically for use in a container of liquid to be consumed by a user, in which a liquid volume is calculated by measurements taken within the container, such as by measuring pressure with a pressure sensor with a piezo-resistive sensing element.

BACKGROUND OF THE INVENTION

Staying hydrated is important for health reasons, and it has become common for people to want to track their water and liquid consumption. The intake of specific volumes of water throughout the day is important for many purposes, such as weight loss or weight maintenance, medical treatments, preventing dehydration, or to maintain a healthy lifestyle. The USDA and the medical community recommend that users consume at least eight eight-ounce glasses of water during a single day. Studies show that lack of sufficient liquid consumption by individuals could have adverse health effects.

One difficulty that people encounter with consuming enough water or liquids throughout the day is tracking how much they have consumed and how much they need to consume.

Some individuals attempt to track their intake of liquids themselves, either by counting the number of glasses they consume or entering consumption manually into a phone application. This can lead to incorrect calculations as many individuals do not accurately track their consumption. Other individuals may use bottles currently on the market which claim to track the amount of liquid consumed from that bottle alone. But at present there exists no product which can be inserted directly into any bottle or glass of the user's choosing and continually track the total consumption and the rate of consumption for that user, as well as provide alerts to users to consume enough throughout the day. What is needed in the art is improvements in devices that track consumption and that can be used in a variety of containers.

SUMMARY OF THE INVENTION

The present invention is a liquid intake tracking device to be inserted into and remain within the main volume of a container.

In accordance with a broad aspect of the invention, a liquid volume is calculated within the container. In one implementation, the liquid volume is calculated by a pressure sensor residing within the interior region of the liquid intake tracking device. The pressure applied on the pressure sensor is communicated wirelessly to an external electronic device. The electronic device (e.g., a smartphone having an app executing on a processor thereof) uses the data to determine the level of liquid in the container, the amount of liquid consumed by the user, and the rate of liquid consumption.

In accordance with a more particular aspect of the invention, a liquid intake tracking device detects changes in a volume of liquid in a beverage container and wirelessly communicates detected information to an electronic device is provided The tracking device is sized to be received within the beverage container. The tracking device includes a pressure sensor with a piezo-resistive sensing element sized and shaped to be received within the beverage container and enclosed within the interior region of the liquid intake tracking device, the interior region being separated from any liquid within the beverage container by a housing. A portion of the housing further contains a flexible, fluid-impermeable membrane capable of acting as a transfer medium between the external environment exposed to liquids within the beverage container and the pressure sensor within the interior region of the housing so as to ensure that the sensor does not come in direct contact with liquid. The liquid in the beverage container exerts a force on the flexible membrane, which causes a sealed volume (e.g., air, $CO_2$, $N_2$, or other non-toxic fluid) located on the interior side of the housing beyond the membrane, or between the membrane and the pressure sensor, to compress or expand so as to cause the pressure to equalize with the liquid in the beverage container. The pressure imparted by the volume of liquid and air within the container is measured by the piezo-resistive sensing element of the pressure sensor. A liquid level detection circuit is connected to the pressure sensor and is operative to measure the pressure exerted on the pressure sensor as a function of the proportion of respective amounts of liquid and air within the volume contained by the container and to output a measurement value. The measurement value of the liquid level detection circuit is indicative of a liquid volume in the beverage container. A wireless communication module is configured to communicate one or more measurement values to an external device.

In accordance with further aspects of the invention as may be implemented in one or more embodiments, a tracking device can be further configured to include further circuitry and functionality. Thus, an accelerometer can be arranged to be operably coupled to the beverage container and to respond to changes in an orientation of the beverage container with an orientation signal. An orientation sensor module can be configured to receive the orientation signal from the accelerometer and determine changes in an orientation of the beverage container between a non-vertical position and a vertical position. A control circuit can be connected to the orientation module and the liquid level detection circuit and operates to inhibit the liquid detection circuit while the orientation of the beverage container is in a non-vertical position. A temperature sensor module and a pH sensor module each can be operably connected to the liquid intake tracking device to detect changes in temperature and pH, respectively, within the beverage container. One or more of these further circuits and devices can be included in a particular implementation of the invention.

In accordance with a further aspect of the invention, a method for tracking liquid intake using a device is provided in which the device is sized to be received within a beverage container and to remain at the bottom of the beverage container to detect changes in a volume of liquid in the beverage container. The method comprises the steps of generating an orientation signal from an accelerometer operably coupled to the beverage container to respond to changes in an orientation of the beverage container, determining changes in orientation of the beverage container between a non-vertical position and a vertical position based on the orientation signal, measuring a pressure on a pressure sensor having a piezo-resistive sensing element, the pressure being a function of a proportion of respective amounts of liquid and air within the beverage container while the beverage container is in a vertical orientation, and transmitting the measured pressure information to an electronic device for use by an input module (a) together with the orientation signal or information derived from the orientation signal, or (b) for only those measurements taken while the beverage container is in a vertical orientation.

DETAILED DESCRIPTION OF CERTAIN EMBODIMENTS OF THE INVENTION

By way of overview and introduction, the present invention comprises a liquid intake tracking device for the measurement of the amount of liquid in a beverage container. The device can be part of a system that includes an application that includes code that runs on a processor of an external device such as a smartphone or web-accessible server. The device connects to the application and exchanges data with the application. In some arrangements, the device performs all calculations so as to communicate to the application a calculated amount of liquid consumed as well as the rate of consumption. In other arrangements, calculations can be performed within the application using raw information communicated from the device. In one implementation, a pressure measurement is taken by a pressure sensor having a piezo-resistive sensing element and used to calculate the level of liquid within the container, as described below. As such, there is a calibration process which precedes device use, using a coordination of information exchange between the device and the application executing in an external electronic device (see FIG. 5), with the calibration information being stored for use in making particular calculations. When such information is stored within a memory unit of the device, the device can make measurement calculations in an autonomous manner and send the computed measurement volumes to the application whenever a communication link is available, and otherwise store that information for transmission when possible. The measurement calculations can be constrained to be made only at selected moments, such as not when motion of the container is detected or when the container is at certain inclinations. An accelerometer and an orientation sensor module are included in the device for at least this purpose.

The liquid intake tracking device resides at the bottom of the beverage container and measures the pressure of the liquid above it. The pressure at the bottom of a column h of water is calculated as follows:

$$P = P_{atm} + \rho g h$$

Where P is the measured pressure in Pascals, $P_{atm}$ is the prevailing atmosphere pressure in Pascals, $\rho$ is the density of the liquid in the beverage container (for water, this is 1000 kg/m$^3$), g is the strength of Earth's gravity (~9.81 m/s$^2$), and h is the height of the water column in meters. Atmospheric pressure ($P_{atm}$) is nominally 101,000 Pascals at sea level, but varies with altitude and weather. To account for variations in atmospheric pressure, during calibration $P_{atm}$ will be independently measured when no liquid is in the beverage container. When the beverage container is filled with a liquid, the water level is calculated as follows:

$$h = (P - P_{atm} - \Delta_P)/\rho g$$

Where P is the measured pressure in Pascals, $P_{atm}$ is the prevailing atmospheric pressure in Pascals, $\Delta_P$ is calculated as the difference between the measured $P_{atm}$ and P when there is no liquid in the beverage container, $\rho$ is the density of the liquid in the beverage container (for water, this value is 1000 kg/m$^3$), and g is the strength of Earth's gravity (~9.81 m/s$^2$).

For the purposes of this application, specific embodiments of the present invention are described and illustrated herein, but these embodiments are exemplary and are not limiting. Additionally, terms that describe relative position refer to an embodiment of the invention as illustrated, but those terms do not limit the orientation in which the embodiments can be used.

Figure 1:
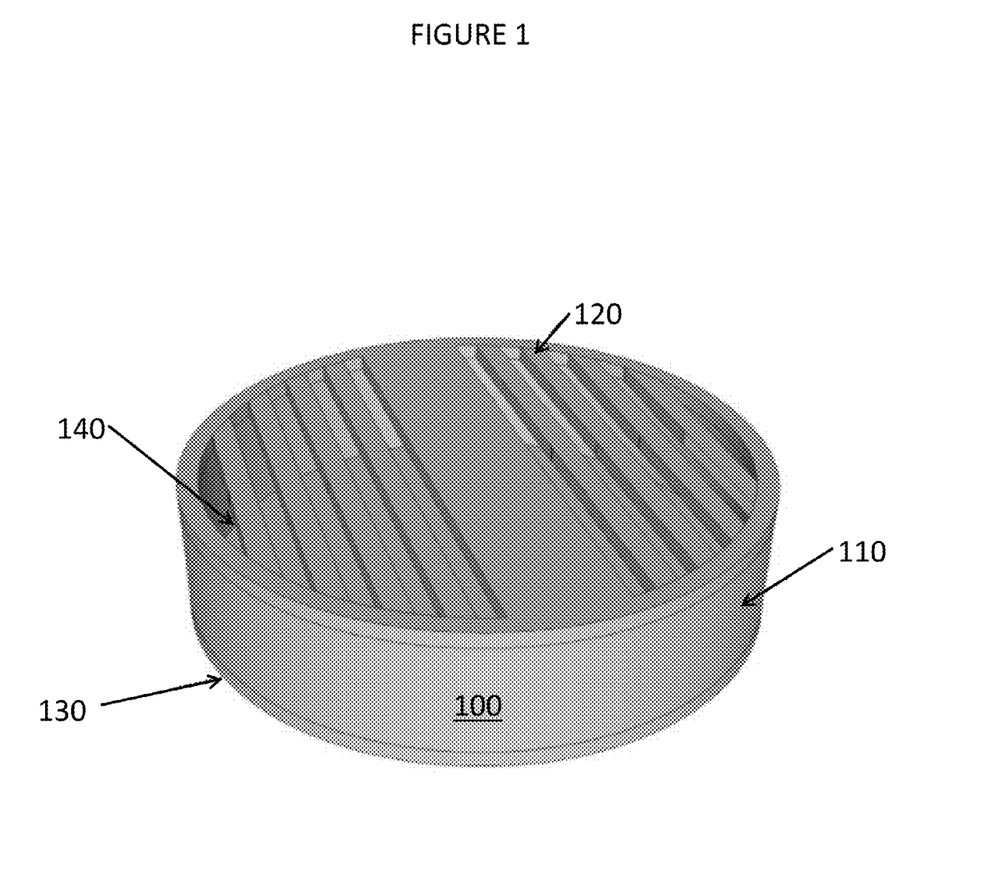
FIG. 1 shows a perspective view of one embodiment of the invention.

As shown in FIG. 1, an embodiment of the liquid intake tracking device 100 has a housing 110 having a top cap 120 and a bottom cap 130, and defines an interior region 320 (see FIG. 3B) separated from any liquid in the beverage container. The housing 110 is sealed and made of a non-permeable material so as to protect the electronic components within from liquid. The top cap 120 defines a series of apertures 140. Liquid can flow in and out through the apertures 140. In a particular environment, the outer dimension of the device is no larger than 37 millimeters at any point, to facilitate insertion and withdrawal from a variety of containers.

Figure 2:
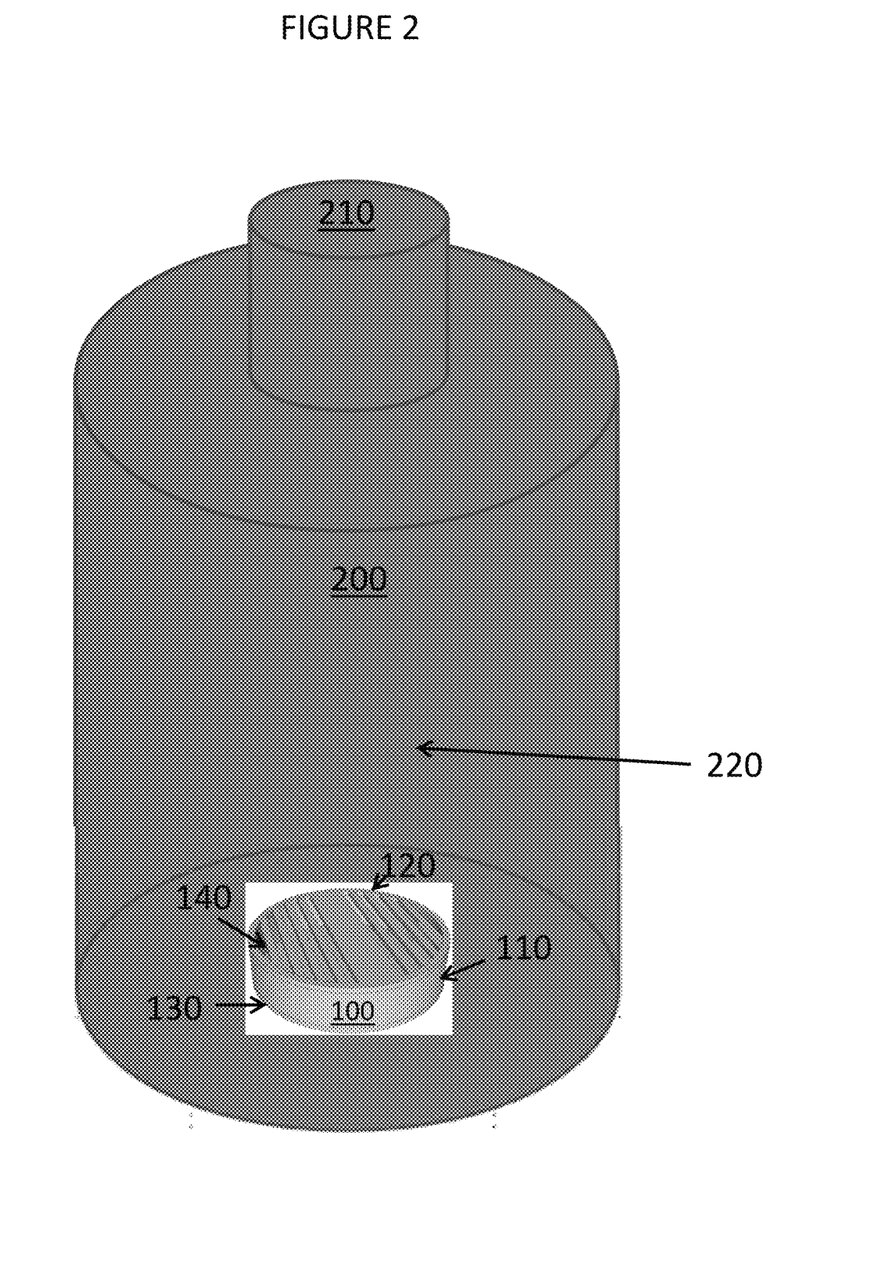
FIG. 2 shows a perspective view of the embodiment of FIG. 1 disposed inside a container.

FIG. 2 shows the liquid intake tracking device 100 in position within a container 200, having been received through top opening 210 and disposed within the main volume 220 of the container. The device remains within and at the bottom of the container 200 throughout use. A variety of container types can be used with the device 100, such as bottles, glasses, and other containers that the device can be inserted into. For containers with a closable top, the device remains secure within the closed container. For containers with an open top, the device can include a ballast (not shown) to secure it from movement as the container is tipped (e.g., when a user is taking a sip).

Figure 3A:
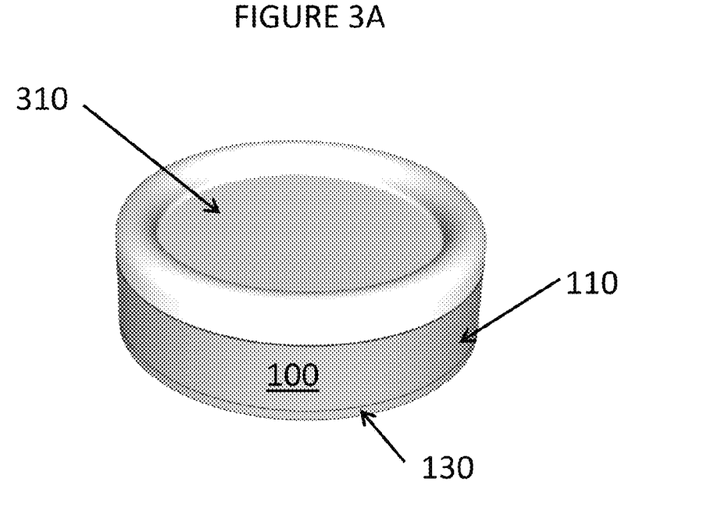
FIG. 3A shows a perspective view of a second embodiment of the invention.
Figure 3B:
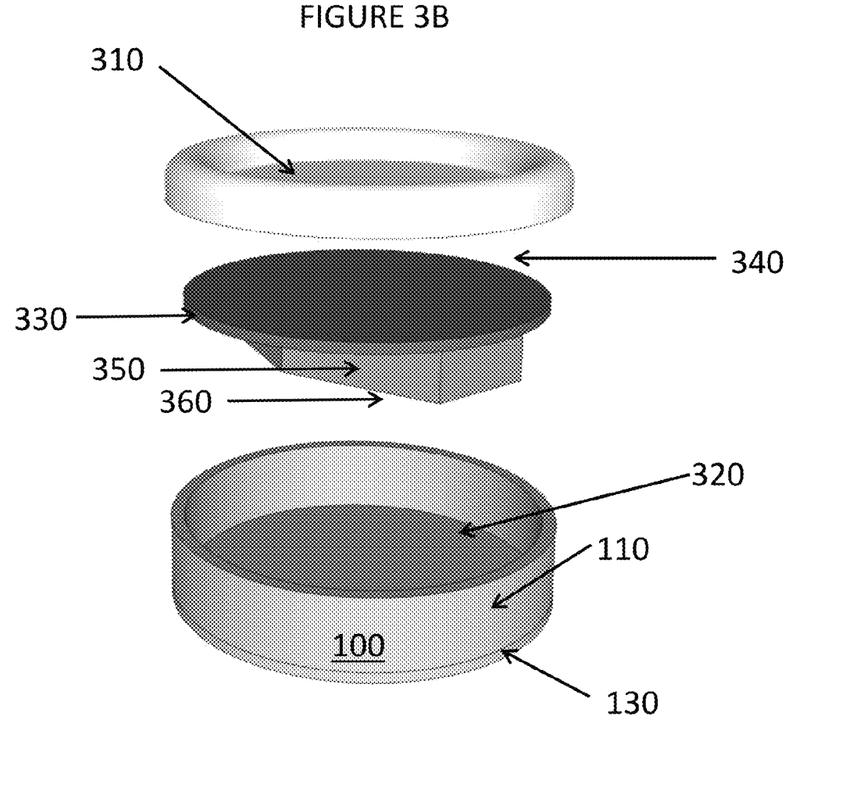
FIG. 3B shows an exploded view of the embodiment of FIG. 3A.

FIGS. 3A and 3B show an illustrative embodiment of the liquid intake tracking device 100 with the top cap 120 not shown in order to provide a better view of the membrane 310 discussed below. As seen in FIG. 3A, the liquid intake tracking device 100 has a housing 110 with a bottom cap 130. In some embodiments, in lieu of a top cap 120, a semi-flexible membrane 310 comprises at least a portion of the housing. In other embodiments, the semi-flexible membrane 310 is located directly below and is sealingly connected to the top cap 120 and in register with the apertures 140 of the top cap 120, such that the liquid in the beverage container can flow through the apertures 140 in the top cap 120 to come in contact with the membrane 310. The membrane 310 is made of a non-permeable material so as to protect the electronic components within from liquid. The membrane has a first side, which is exposed to the liquid within the beverage container, and a second side, which isolates any liquid within the beverage container from the components within the housing and which flexes into the interior region of the liquid intake tracking device and thereby changes the pressure within at least a portion of the housing. In some embodiments, the membrane 310 could be silicon molded with plastic. The membrane 310 flexes in response to the pressure imparted by liquid in the beverage container. FIG. 3B shows an exploded view of the liquid intake tracking device 100 to better illustrate the arrangement of elements within the interior region 320 of the liquid intake tracking device 100. The interior region 320 is separated from any liquid in the beverage container by the housing 110. A circuit board 330 is located beneath the flexible membrane 310 such that a sealed volume 340 exists between the membrane 310 and the circuit board 330, for example, a sealed volume of air. In an ideal embodiment, the ratio of the surface area of the membrane 310 to the volume 340 is large to reduce stress on the membrane 310. A pressure sensor 410 (see FIG. 4) is located within the sealed volume, preferably on the circuit board 330. In some embodiments, the pressure sensor 410 is a barometric pressure sensor with a piezo resistive sensing element. The pressure sensor 410 can measure a force that is applied from an external environment upon the liquid intake tracking device 100, such as by a liquid in a beverage container 200. Unless the pressure sensor is itself a sealed structure, it should not come in direct contact with liquid within the beverage container, but rather the pressure measurement should be taken indirectly. As liquid flows onto the membrane 310, either directly or through the apertures 140 on the top cap 120, the membrane 310 causes the volume 340 to compress or expand so as to cause the pressure of the volume 340 to equalize with the pressure of the surrounding liquid. The pressure sensor 410 measures the pressure exerted upon it by the volume 340. The liquid level within the volume is calculated by a liquid level detection circuit connected to the pressure sensor 410. That circuit comprises a hardware processor 450 executing code that calculates a pressure measurement value from the pressure sensor. The value of the pressure changes as a function of the respective amounts of liquid and air in the container. In particular, different liquids have specific densities.

The respective pressure values measured when the container is empty and full can be captured during a calibration process in coordination with a software application that guides the user on capturing such data and which causes the information to be stored, as discussed further below. The pressure at the bottom of a column of water, for instance, can be calculated by the formula $P = P_{atm} + \rho g h$, where P is the measured pressure in Pascals, $P_{atm}$ is the atmospheric pressure in Pascals, $\rho$ is the density of the liquid in the container 200, g is the strength of Earth's gravity (~9.81 m/s$^2$), and h is the height of the water column in meters. When the container 200 is filled with liquid, the liquid will exert a measured pressure upon the device 100 which can be used to calculate the volume of the liquid in the container 200 throughout changes as the liquid is being consumed.

Figure 4:
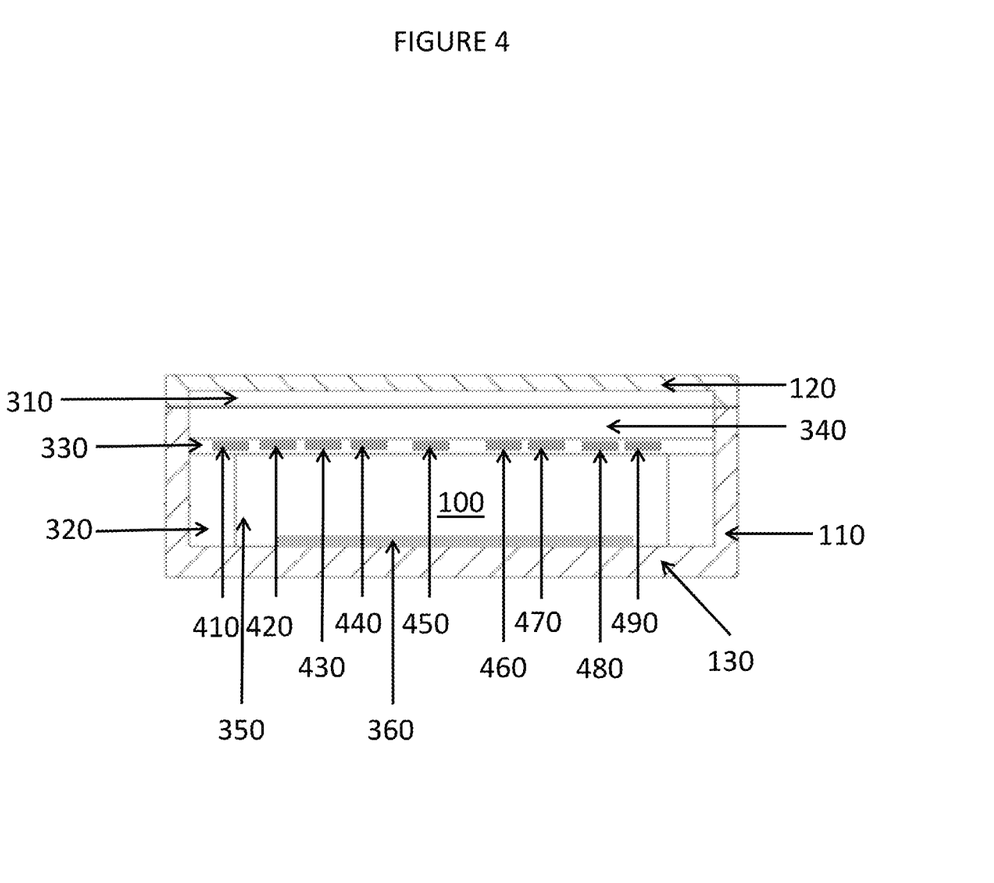
FIG. 4 shows a cross-sectional view of the arrangement of FIG. 1.
Figure 5:
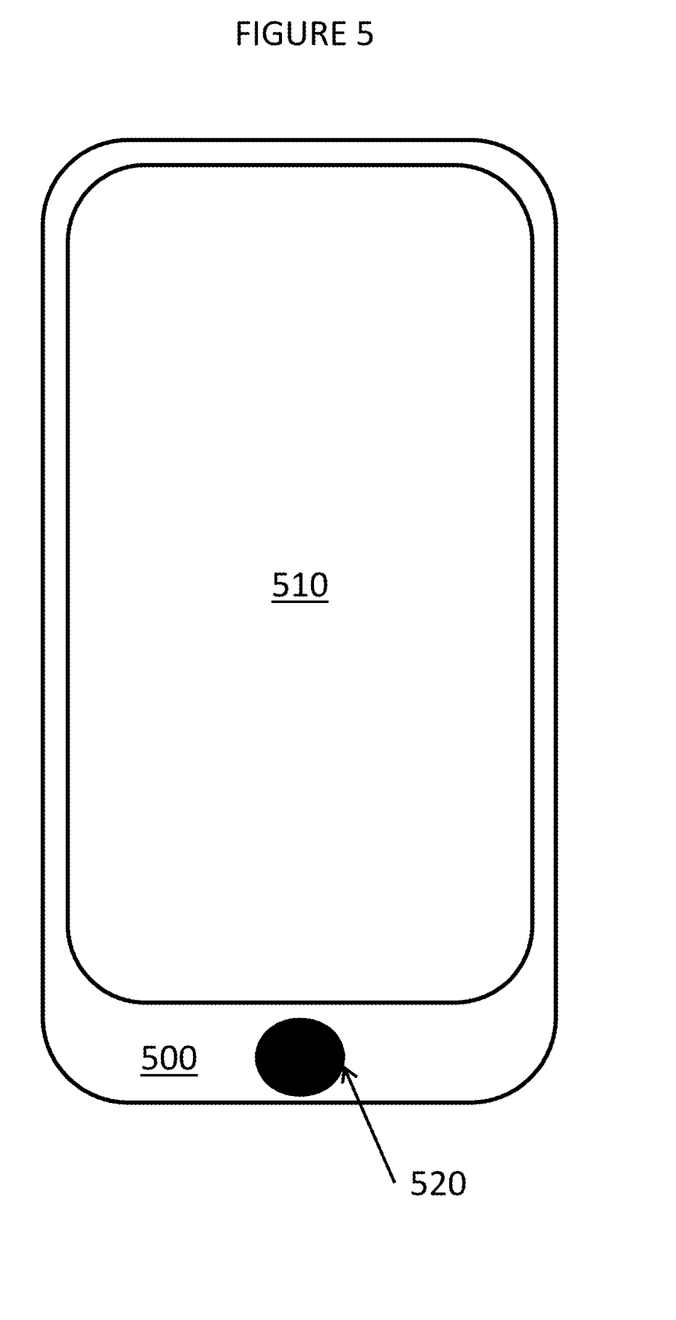
FIG. 5 illustrates an exemplary external electronic device.

In some embodiments, the initial calibration measurements of the empty container can be used to calculate any differences noted between the pressure sensor 410 in the device and a barometric pressure sensor included with an external electronic device 500 to calibrate the pressure value measured in the empty and full container in relation to the pressure sensed by the electronic device 500. The value of the $P_{atm}$ can be sensed by a barometric pressure sensor on the external electronic device 500, when such a sensor is available, and such information can be sensed each time a pressure reading is taken by the liquid intake tracking device 100, at interval time periods set by the user, at the request of the user, or at some other interval, and the algorithm can include code implemented to utilize such readings in order to adjust the pressure measurements by the intake tracking device 100 in order to provide liquid intake reports that are adjusted to compensate for prevailing (including changed) atmospheric pressure values. The fluid volume can be reported as a percentage (¾ full, or in units such as 600 ml left or 400 ml consumed).

The device 100 includes a source of electrical power, such as an electrical power storage device 350. The electrical power storage device can be a battery for instance, a LiFePO$_4$ battery. A suitable battery has capacity to energize the device for one or more days of use. In a more particular embodiment, a wireless charging coil 360 can be provided and configured to charge the power storage device 350. The wireless charging coil 360 can be located below the battery to minimize distance and obstructions between the charging coil and a wireless power transmitter. In that case, the container 200 and the device 100 disposed therein can be placed on a wireless power transmitter so as to charge the device without removal from the container. For example, the wireless charging can be performed according to the Qi standard. In some embodiments, the device includes an alert module comprising code that executes in the processor and causes an alert signal to be issued and drive a suitable alert device (e.g., a piezo, a speaker, a light, and so on) so as to indicate user when the charging of the electrical power storage device 350 is complete.

FIG. 4 shows a cross-sectional view of the embodiment illustrated in FIGS. 1, 3A, and 3B. The device includes a wireless communication module 420 located on the circuit board 330 which is configured to enable communication of one or more measurement values from the liquid level detection circuit to an external electronic device 500 (see FIG. 5) such as a smart phone. Communications can be in accordance with a variety of protocols. For instance, wireless communication can be accomplished through use of the Bluetooth 4.0 standard. The external electronic device 500 is capable of storing and tracking the data provided by the device. Among the data provided to the external electronic device 500 is information that enables presentation of the total consumption (as shown) and the average consumption over a period of time such as on a graph showing consumption amount plotted against days of the week or weeks of the year, and so on (not shown). Such information can be conveyed wirelessly from the device 100 or computed at the EED 500.

The device 100, in certain implementations, includes an accelerometer 430 and an orientation sensor module 440. These components, as well as the wireless communication module 403, can be located on the circuit board. The accelerometer 430 provides signals in response to changes in an orientation of the beverage container indicative of whether the device is in motion. In such embodiments, signals output by the accelerometer are provided to the processor 450 and are processed by code executing therein to determine whether the device 100, and hence the container 200, is in motion. Similarly, the orientation sensor module 440 provides signals to the processor 450 which are processed by code executing therein to determine whether the device 100, and hence the container 200, is in a vertical or non-vertical position, and optionally any particular angle in between. Changes in bottle orientation and any agitation of liquid within the container and can have an effect on the liquid level in tracking devices which rely on distance measurements relative to a sensor (e.g., ultrasonic measurements) or in those that utilize column height measurements. In the embodiments described herein, the housing obtains measurements via a pressure sensor 410 and, as such, is relatively insensitive to sloshing or liquid movement as long as the device remains within the volume of fluid and not exposed to air within the beverage container 200. Nevertheless, in certain embodiments, the processor 450 is configured by the programmed code that it executes to determine, based on accelerometer and orientation sensor module information, whether to take a measurement at a given time based on the orientation and movement of the device. The orientation sensor 440 and the liquid level detection circuit are connected to a control circuit which includes the hardware processor 450 and memory 460 for storing information about one or more containers with which the device 100 has been associated during calibration (as discussed below), liquid level measurements made by the processor, the time of such measurements, and other data. The control circuit can comprise further code which causes the processor to inhibit the liquid detection circuit from taking liquid level measurements while the container or its orientation are determined to be in a state of motion or in an undesired orientation. By constraining the detection circuitry, a higher percentage of the measurements have valid data and energy within the electrical power storage device is more efficiently preserved.

In one embodiment, the housing is covered with a silicone casing to reduce noise and rattle when the device is inserted into the bottle.

In a more particular embodiment, a temperature sensor module 470 is connected as part of the control circuit to provide a temperature reading signal of the liquid temperature either in real-time or on-demand. The temperature readings can be communicated wirelessly to the EED 500 by the wireless communication module 420. Alternatively, the reading signals can be used by the processor 450 to account for variations of pressure measurements that occur with changes in temperature and inform an algorithm executing in the control circuit (as an input to the algorithm) so as to provide a more accurate determination of the liquid level at the time of the measurement.

In some embodiments, a pH sensor module 470 can be provided to a pH reading of the liquid either in real-time or on-demand. The pH sensor module and the temperature sensor module can be located on the circuit board. Optionally, the sensor element of each of these modules has a face exposed to fluid in the container, such as through an opening in the housing 110. The pH readings are communicated wirelessly to the EED 500 by the wireless communication module 420. Alternatively, the pH readings can be used by the processor 450 to account for variations of pH level to inform an algorithm executing in the control circuit (as an input to the algorithm) so as to provide a more accurate determination of the liquid level at the time of the measurement due to variations of pressure that occur with changes in pH.

Optionally, some embodiments of the invention can have a ballast (not shown) positioned within the body of the device to ensure the liquid intake tracking device stays disposed at the bottom of the beverage container throughout use. The ballast can be a heavy element or material, such as steel or sand.

In some embodiments, a porous compartment can be provided which has apertures that are in fluid communication with any liquid in the beverage container. The compartment can have a closeable access or otherwise be configured to receive a plurality of ceramic beads. For instance, the beads can be loose or included in a cartridge or pouch that fits into the compartment. The apertures are sized to not permit release of the beads into the liquid within the container, yet permit passage of the liquid into the compartment and across the beads. The beads have a combined surface area that interacts with the liquid for any one of a variety of purposes, such as to regulate the pH of water used as the liquid in the container. Such a compartment can attach to the device 100, for example, by clipping onto it, or can be constructed as part of the device 100. In one or more arrangements, the beads can be combined with a ballast material.

Figure 5A:
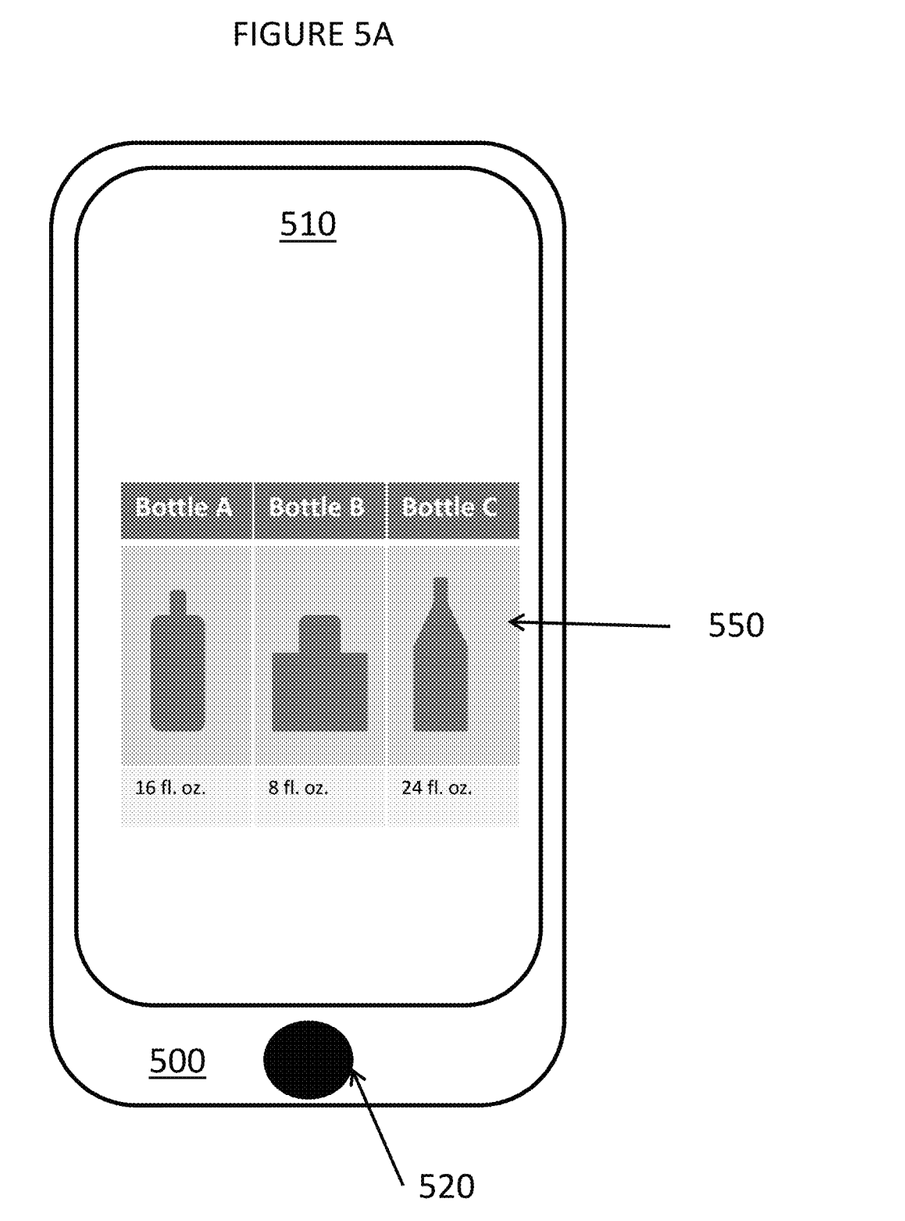
FIGS. 5A and 5B illustrate outputs on a display of the external electronic device that can be provided based on coordinated communication between the external electronic device and a liquid tracking device such as illustrated in FIGS. 1 through 4.

Some embodiments of the device can provide the user with alerts. One type of alert is an audible alert provided by a piezo buzzer 480 located on the circuit board. Another type of alert is a visual alert provided by an LED light 490 located on the circuit board. A third type of alert is a notification provided on or by the EED 500 (e.g., as a result of a Bluetooth push-notification from the control circuit), on a display 510 thereof, rather than at the device 100. The alert can take many forms, such as a visual "Alert" 530 on the display of the EED 500, as shown in FIG. 5A. Alert settings can be established in the user's preferences, by interaction with an app executing on the EED 500, and thereafter be uploaded to the memory 440. One alert could be to drink more or less liquid to reach a target consumption rate 540. Thus, for instance, if the container is filled with water, the alert can be to consume more liquid. If the container is filled with an alcoholic drink, the alert can be to moderate consumption and consume less liquid (e.g., during the course of a party, etc.). Another user alert could be to refill the beverage container when the level of liquid in the container is determined to be empty. The target consumption can be a rate (liquid intake over time, as calculated by the processor in the electronic device) or an amount. The amount can be a daily goal. The display can provide summaries of consumption during the present week, a daily average, whether consumption goals have been met and/or the degree to which a goal or prior goals have been met, and so on.

Figure 5B:
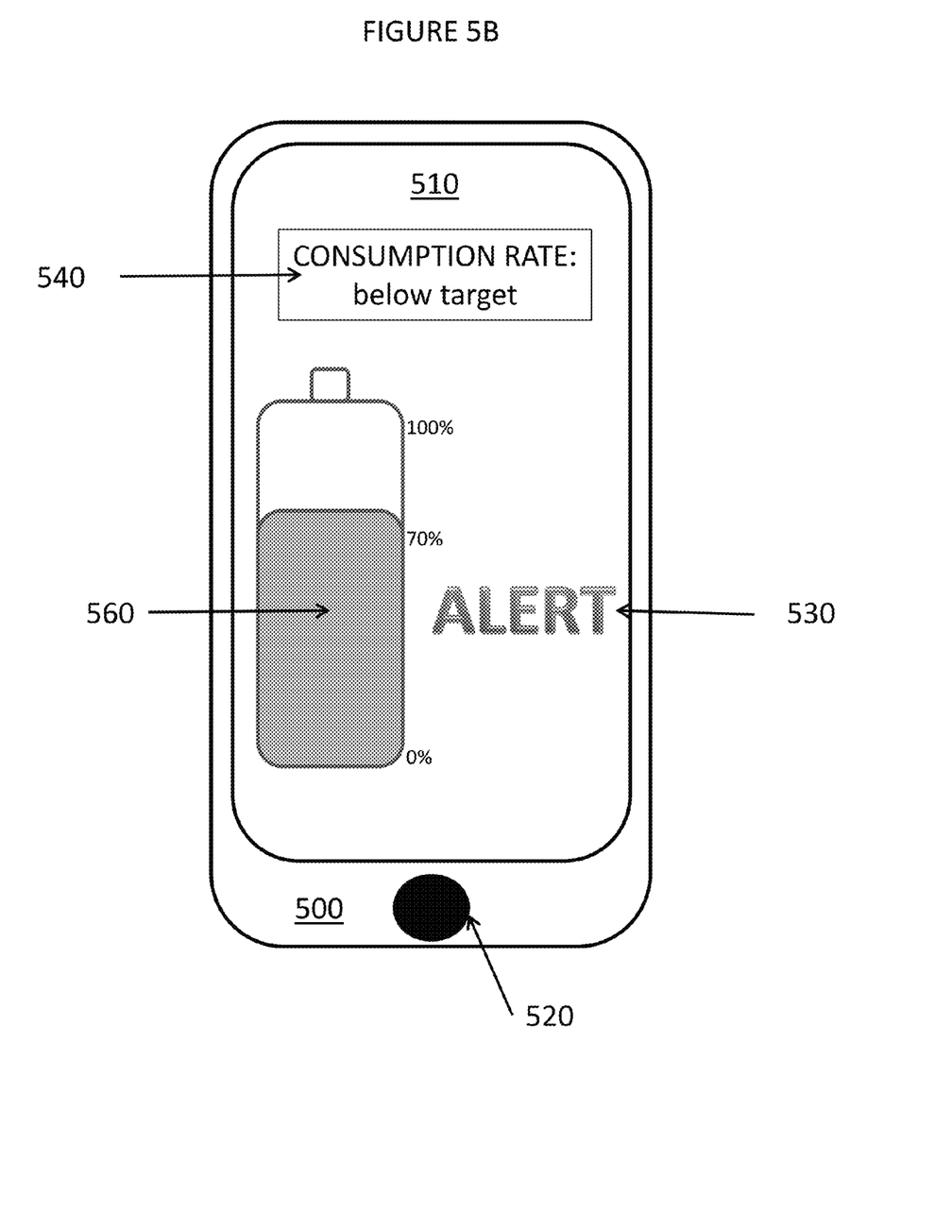

In operation, a user accesses a software application via a web browser or an app store, such as Google Play or the Apple Store, and executes the application on a device such as the EED 500. The machine executing the application provides a wireless interface to the control circuit to enable a user to establish environmental settings for the device 100. The settings enable the device to be associated with one or more containers 550, by interacting with one or more buttons 520 or other inputs (e.g., a touch-screen or a voice command module). A beverage-container profile module stores and provides beverage container profile information. Each container can have a different total liquid storage amount (volume) and shape, and that information can be input by the user directly or input by selecting an icon representative of the appropriate setting (as shown). Selections can be provided through the EED 500 and provided by wireless communication to the communication module 403 of the device, and from there to the control circuit for storage in the memory 440. Thereafter, the device can operate substantially autonomously in collecting and storing information concerning use of the device with a selected container. In other words, the device 100 can take liquid level measurements over time and store those measurements even if there is no connectivity to the EED. When communications are established again between the device and the EED, the measurements and other data such as temperature and pH, if available, can be uploaded to the EED for display on the screen. Among other information that can be displayed is the amount of fluid consumed 560 (e.g., as a percentage (as shown) or as a number of ounces or milliliters), whether the user is ahead of, behind, or on a target consumption rate 540, and a variety of other information concerning the fluids consumed that day, that week, or over any other measuring period. The measurements and other information can be shared from the EED over a connection to a server in support of sharing via a social network or otherwise.

The software application on the EED further comprises an input module to receive the measured pressure from the liquid intake tracking device 100 via the wireless communication module 420; a level determination module executed in the processor to determine the level of liquid in the beverage container as a function of the pressure measured by the pressure sensor 410; a calculation module executed in the processor to calculate the amount of liquid intake as a function of the changes in the level of liquid in the beverage container, the volume information from the beverage-container profile, and the liquid level values calculated by the level determination module; and an output module executed in the processor to show on the EED display 510 information including the amount of liquid intake. Each of these modules comprises code that is implemented to provide the respective functionalities noted above, using algorithms, formulae, and steps understood from the foregoing description as well as by persons having ordinary skill in the art.

In one embodiment, all components of the liquid intake tracking device are heat resistant to at least 70 degrees Celsius to allow the device to be dishwasher safe and to be used in hot liquids. In another embodiment, the device has walls that have a continuous (e.g., smooth texture) for use with carbonated liquids to minimize bubble formation. This can be accomplished, for example, with PTFE coatings. In yet another embodiment, the device can be used with inhomogeneous liquids, such as powder based solutions.

In some embodiments, the device 100 can enter a deep sleep mode in order to conserve energy. During deep sleep, the processor 450 is put in a low power state by code implemented therein which prohibits communication between the device 100 and the EED 500 until it receives a prompt from either the accelerometer that the beverage container is in use, the wireless communion module, or a timer.

Figure 6:
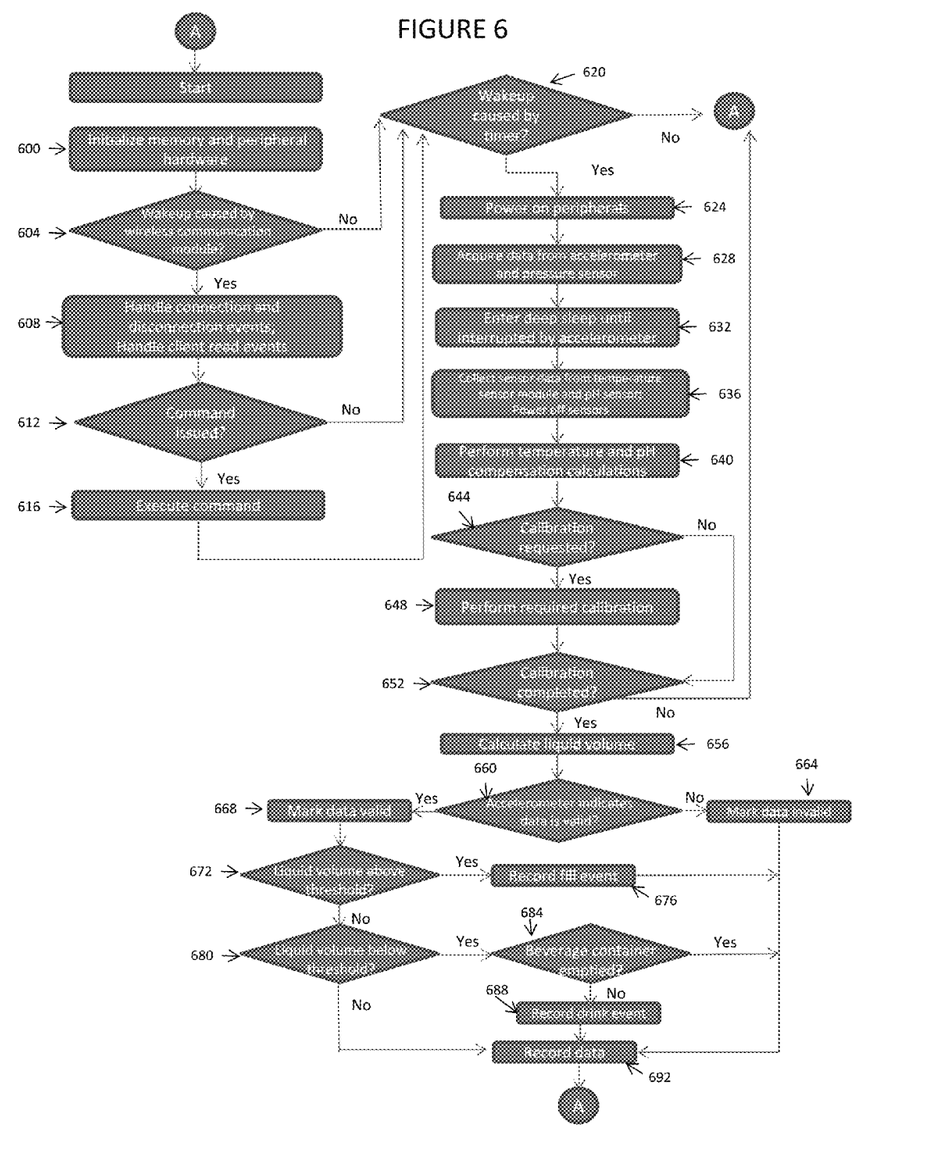
FIG. 6 is a flow diagram illustrating several aspects of the use of a liquid tracking device in accordance with one or more embodiments of the invention.

FIG. 6 illustrates certain processes that are performed by the liquid tracking device 100. The processes illustrated in FIG. 6 can be taken in a different order, or not in the same flow as illustrated. The flow diagram is an expedient for discussing operation of the device 100, and is not meant to be restrictive of the particular order of steps or the number of steps that need be taken in any given implementation. Rather, methods in accordance with the invention are defined by the claims that follow this description.

Turning then to FIG. 6, as shown, for instance, after the initialization of memory and peripheral hardware at step 600, which can include all of the calibration and set-up discussed above, a test is made at step 604 to determine, for a device already in the deep sleep state, whether to wake to a fully-operative state. The deep sleep mode helps the device 100 to reduce the overall amount of power consumed, as the sensors consume power while performing measurements.

The device wakeup routine is implemented by the processor 450 and can be programmed at step 604 to respond to the wireless communication module 420. This can be detected by signals arriving at the wireless communication module 420. As noted in step 612, the programming comprises code that is implemented in the processor 450 to determine if a command was issued by the user. The processor can execute that command in step 616. If the wakeup is a response to the wireless communication module 420, at step 608 the EED 500 first handles connection and disconnection events and client read events. If a command has been issued by the user in step 612, the device 100 and the EED 500 executes the command in step 616.

As noted at step 620 the device 100 wakeup can be programmed to respond to the accelerometer 430 or a timer, and, in that instance, the device 100 and EED 500 acquire accelerometer and pressure sensor data (step 628), determine if calibration is requested (step 644), and calculate liquid level (step 656), as discussed in detail below, all in response to such programming.

If there is no wake up event, as determined at steps 604 and 620, the process can resume at start, looping in this manner in a low power mode, as indicated by the connector "A" back to start.

After the EED 500 powers on peripherals, as indicated at step 624, the EED 500 implements step 628 to receive data from the pressure sensor 410 to determine the barometric pressure.

In certain embodiments, data is also received from the accelerometer 430, when present, to determine the orientation and any movement of the device 100. In one implementation in which an accelerometer is used, the device 100 can then reenter deep sleep until the accelerometer 430 determines that the device is in use, as shown in step 632. When the accelerometer 430 activates the device 100, at shown at step 632, the devices sends sensor data from the temperature sensor module 460 and any pH sensor 470, if present, to the EED 500, at step 636. Once the sensor data has been sent by the device 100 to the EED 500 at step 636, embodiments that include the temperature sensor module 460 and the pH sensor 470 can have those elements powered off to further conserve energy.

At step 640, the sensor data can be used to perform compensation calculations to adjust for variations in the pressure reading with respect to the temperature and pressure, as these parameters are sensitive to changes in temperature and pressure. In certain embodiments, adjustments are made for variations in either pressure or temperature. In still other embodiments, the calculation of fluid level is made without regard to changes in pressure or temperature.

At step 644, a calibration process is may be requested by the user such as when using the liquid tracking device 100 with a new container, or by programming in the processor configured to request recalibration after a time period or event. As indicated at step 648, a calibration is performed at least prior to device use. An ambient pressure reading of the empty beverage container 200 is taken by the pressure sensor 410 and communicated via the wireless communication module 420 to the EED 500. The readings taken of the empty beverage container can be used to calculate any differences noted between the device's pressure sensor 410 and any barometric pressure sensor included in the EED 500, but certainly are used to calculate any difference between the measured atmospheric pressure and the prevailing atmospheric pressure to account for variations due to altitude or weather. The temperature can be determined at this point in the calibration process by the temperature sensor module 460, when available, and communicated via the wireless communication module 420 to the EED 500 for use in performing calculations to compensate for changes in pressure measured by the pressure sensor as a result of temperature. Likewise, the pH can be determined by the pH sensor 470, when present, and communicated via the wireless communication module 420 to the EED 500 for use in performing calculations to compensate for changes in pressure measured by the pressure sensor as a result of the now-known pH level.

The beverage container 200 is then filled to maximum capacity and a second pressure reading is taken (optionally with further temperature or pH readings) and communicated wirelessly via the wireless communication module 420 to the EED 500. The readings taken of the full beverage container are used to establish a pressure measured by the sensor when the bottle is at its maximum capacity. The measured pressure readings of the empty container and the full container are used together to determine the level of the water in the container. The water level is calculated first as a linear quantity based on the measured pressure of the sensor; level is computed using the calculations previously described herein. Any barometric pressure readings taken by the barometric pressure sensor on the EED 500 can also be used retroactively to account for variations in atmospheric pressure if the EED 500 and the liquid intake tracking device 100 are not in wireless communication with each other during use.

Once calibration has been completed at step 652, the level of the liquid in the beverage container can be calculated at step 656. During step 660, the processor can be programmed to use information from any accelerometer to determine whether the data is valid based on the orientation and any movement of the beverage container. Data can be marked as either valid (as noted in step 668) or invalid (as noted in step 664). During step 692, data that was marked as invalid in step 664 is recorded while data that was marked as valid in step 668 undergoes additional processing at steps 672 through 688, as discussed next.

In the event that data is marked valid (or otherwise has been gathered in implementations in which the "validity" of the data is not tested), processing continues to determine the level of liquid in the beverage container at any given time at which the determination is being made, and, correspondingly, to determine the amount of liquid consumed by the user at that time.

If the liquid level is above a threshold value, as determined during step 672, a "fill" event is recorded at steps 676 and 692, as this is indicative of the container having been filled. If the liquid level is below a threshold value, as determined during step 680, the liquid level is calculated to determine if the level of liquid in the beverage container had been emptied (step 684). If the beverage container had been emptied, this data is recorded at step 692. If the beverage container is not entirely empty, then a "drink" event is recorded at step 688 (which can be the same data recordation as indicated at step 692). After the data is recorded, the process can loop back to start, as indicated by the connector "A."

It should be understood that various combinations, alternatives, and modifications of the present invention could be devised by those skilled in the art. The present invention is intended to embrace all such alternatives, modifications, and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

We claim:

1. A liquid intake tracking device that detects changes in a volume of liquid within a beverage container and that wirelessly communicates detected information to an external electronic device, comprising:
    a pressure sensor sized and shaped to be received within the beverage container and configured to emit a signal in response to pressure imparted on the pressure sensor by any liquid in the beverage container;
    a liquid level detection circuit connected to the pressure sensor and operative to measure the pressure of the sealed volume and output at least a first measurement value concerning a first calibration, a second measurement value concerning a second calibration, and a current volume measurement value, wherein the first calibration measurement value is indicative of the beverage container being empty, the second calibration measurement value is indicative of the beverage container being filled, and the current volume measurement value is indicative of a current liquid volume in the beverage container;
    a control circuit having a processor and a memory unit configured to receive and store the first calibration measurement value, the second calibration measurement value, and the current volume measurement value; and
    a wireless communication module configured to communicate at least the first calibration measurement value, the second calibration measurement value, and the current volume measurement value to the external electronic device,
    wherein the control circuit of the liquid intake tracking device is configured to provide at least the current volume measurement value to the external electronic device in an autonomous manner.

2. The liquid intake tracking device of claim 1, further comprising a ballast.

3. The liquid intake tracking device of claim 1, further comprising:
    an accelerometer arranged to be operably coupled to the beverage container to respond to changes in an orientation of the beverage container with an orientation signal; and
    an orientation sensor module configured to receive the orientation signal from the accelerometer and determine changes in an orientation of the beverage container between a non-vertical position and a vertical position,
    wherein the wireless communication module communicates the one or more measurement values at a time after the orientation sensor module determines changes in the orientation of the beverage container from a non-vertical to a vertical position.

4. The liquid intake tracking device of claim 3, wherein the liquid level detection circuit, the accelerometer, the orientation sensor module, and the wireless communication module are disposed on a circuit board.

5. The liquid intake tracking device of claim 3, further comprising a control circuit connected to the orientation module and the liquid level detection circuit and operative to inhibit the liquid detection circuit while the orientation of the beverage container is in a non-vertical position.

6. The liquid intake tracking device of claim 1, further comprising a housing sized and shaped to receive the pressure sensor, wherein the housing further comprises a top cap, wherein the one or more apertures are included in the top cap.

7. The liquid intake tracking device of claim 6, wherein the pressure sensor is sealingly connected to the top cap.

8. The liquid intake tracking device of claim 1, further comprising a housing and a temperature sensor module disposed in relation to the housing so as to detect the temperature changes within the beverage container, the temperature sensor module providing a temperature measurement signal as an output to the wireless communication module.

9. The liquid intake tracking device of claim 1, further comprising a housing and a pH sensor module disposed in relation to the housing so as to detect the pH of the liquid within the beverage container, the pH sensor module providing a pH measurement signal as an output to the wireless communication module.

10. The liquid intake tracking device of claim 1, further comprising:
an electrical power storage device; and
a wireless charging coil configured to charge the electrical power storage device via an inductive coupling.

11. The liquid intake tracking device of claim 1, further comprising, a porous compartment in fluid communication with the liquid in the beverage container, the porous compartment having a closeable access and being sized to receive a plurality of ceramic beads.

12. A liquid intake tracking device that detects changes in a volume of liquid within a beverage container and that wirelessly communicates detected information to an external electronic device, comprising:
a housing sized and shaped to be received within the beverage container and defining an interior region separated from any liquid within the beverage container;
a pressure sensor disposed within the housing;
a liquid level detection circuit connected to the pressure sensor and operative to measure the pressure of the sealed volume and output at least a first measurement value concerning a first calibration, a second measurement value concerning a second calibration, and a current volume measurement value, wherein the first calibration measurement value is indicative of the beverage container being empty, the second calibration measurement value is indicative of the beverage container being filled, and the current volume measurement value is indicative of a current liquid volume in the beverage container; and
a wireless communication module configured to communicate at least the first calibration, second calibration and current volume values to external electronic device.

13. A method for tracking liquid intake using a device being sized to be received within a beverage container to detect changes in a volume of liquid in the beverage container, comprising the steps of:
disposing the device within the beverage container, the device including:
a pressure sensor;
a wireless communication module configured to communicate one or more measurement values to an external electronic device;
calibrating the device relative to the beverage container by processing pressure readings while the beverage container is indicated by a user operating the external electronic device as being empty of any liquid and while the beverage container is indicated by the user operating the external electronic device as being full;
receiving atmospheric pressure data from at least one barometric sensor in communication with the external electronic device;
calculating the difference between the pressure reading obtained while the beverage container is empty and the received atmospheric pressure data,
adjusting the pressure reading obtained while the beverage container is full in response to the calculation;
detecting changes in pressure within the sealed interior volume using the pressure sensor, the pressure being a function of a proportion of amount of liquid within the beverage container at the time of detection; and
wirelessly transmitting the measured pressure information to the external electronic device using the wireless communication module.

14. The method of claim 13, further comprising:
providing an application for execution in a processor of the external electronic device, the application including code comprising one or more modules, including:
a beverage-container profile which stores and provides beverage container profile information including at least volume information concerning a volume of liquid that can be contained by the beverage container;
an input module which receives the measured pressure from the device over a wireless connection to the device;
a level determination module which executes in the processor to determine the level of the liquid in the beverage container as a function of the measured pressure;
a calculation module which executes in the processor to calculate an amount of liquid intake as a function of changes in the level of liquid in the beverage container and the volume information in the beverage-container profile using liquid volume values determined by the level determination module; and
an output module which executes in the processor to display at least the amount of liquid intake on a display of the electronic device.

15. The method of claim 13, further comprising the steps of generating and providing an alert to a user, using an alert module executing in the processor of the electronic device, to consume more liquid.

16. The method of claim 13, further comprising the step of proving an alert to a user, using an alert module executing in the processor of the electronic device, to consume less liquid.

17. The method of claim 13, further comprising the step providing an alert to the user, using an alert module executing in the processor of the electronic device, to refill the beverage container when the volume of liquid in the beverage container determined by the level determination module indicates that the beverage container is empty.

18. The method of claim 13, further comprising the step calculating a rate of liquid consumption as a function of the calculated liquid intake over time, using the processor in the electronic device.

19. The method of claim 13, further comprising the steps of:
- detecting a temperature of the liquid in the beverage container using a temperate sensor;
- transmitting the detected temperature to the electronic device for use by the input module; and
- calibrating the liquid level determined by the level determination module to compensate for changes in pressure measured by the pressure sensor as a result of any change in detected temperature of the liquid.

* * * * *